Sept. 12, 1933.  H. P. MacGREGOR ET AL  1,926,450
LOOSE STEM SPLIT ROTOR AND LUBRICATED VALVE
Filed June 23, 1930   4 Sheets-Sheet 1

INVENTORS
Halbert P. MacGregor.
Frederick H. Hehemann.
BY Toulmin & Toulmin
ATTORNEYS Sept. 12, 1933.   H. P. MacGREGOR ET AL   1,926,450
LOOSE STEM SPLIT ROTOR AND LUBRICATED VALVE
Filed June 23, 1930      4 Sheets-Sheet 2

INVENTORS
Halbert P. MacGregor
Frederick H. Habermann
BY
Toulmin & Toulmin
ATTORNEYS Sept. 12, 1933.    H. P. MacGREGOR ET AL    1,926,450
LOOSE STEM SPLIT ROTOR AND LUBRICATED VALVE
Filed June 23, 1930    4 Sheets-Sheet 4
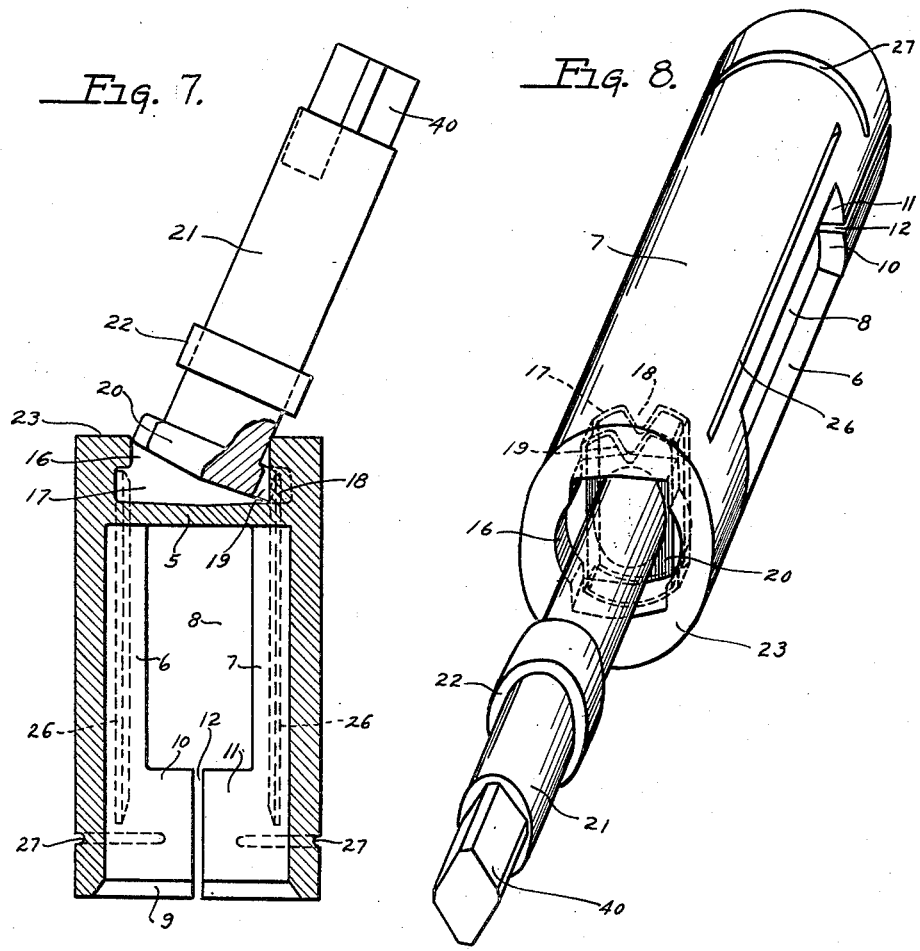
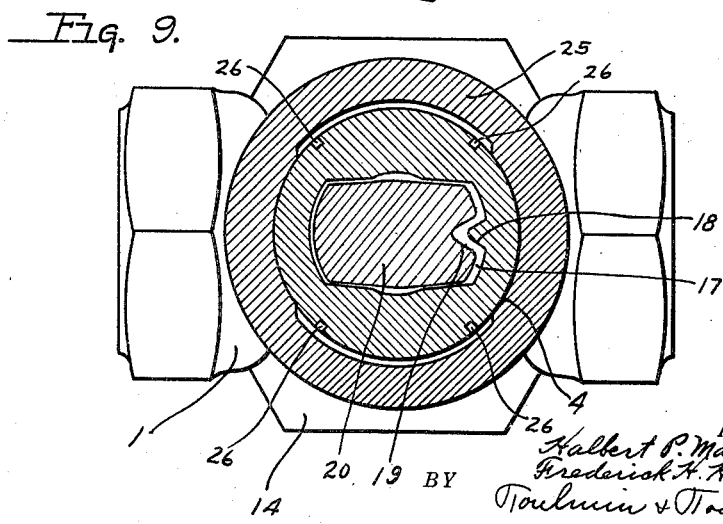

Patented Sept. 12, 1933

1,926,450

UNITED STATES PATENT OFFICE 1,926,450

LOOSE STEM SPLIT ROTOR AND LUBRICATED VALVE

Halbert P. MacGregor and Frederick H. Hehemann, Cincinnati, Ohio, assignors to The Lunkenheimer Company, Cincinnati, Ohio, a corporation of Ohio Application June 23, 1930. Serial No. 463,148

9 Claims. (Cl. 251—93)

Our invention relates to lubricated valves.

It is an object of our invention to provide an unbalanced, split rotor for a two-way valve having a detachable stem so arranged as to be detached from the rotor but when in operative position to operate the rotor with it.

It is a further object of our invention to provide an unbalanced rotor of cylindrical form adapted to control a two-way valve and to utilize the line pressure for expelling lubricant between the rotor and the casing wall without erratic action of the valve and the consequent waste of lubricant.

It is a further object to provide for the marked advantage in production of producing the rotor separately from the valve stem and of different materials when so desired. As for instance, a cast iron rotor body and a turned steel or forged steel stem which is subjected to the abuse and wear of operating tools.

It is a further object to provide such a stem that is readily attachable and detachable but fully operative for rotation of the rotor when in operating position.

It is a still further object to provide the combination of these advantages of an unbalanced, non-erratic split rotor and to provide a construction that will enable these two advantages to be combined so that the stem can be connected to the rotor to bring about the unbalance due to the greater line pressure operating on the greater area of the rotor than the atmospheric pressure under the lesser pressure on the valve stem.

It is an object to provide a laterally immovable valve stem and a laterally movable rotor with yielding side walls so that the movement of said walls will be accommodated on the stem while the stem and rotor will move together rotatably and vertically.

Referring to the drawings:

Figure 2 is a section on the line 2—2 thereof showing the valve in closed position without the line pressure being on;

Figure 1:
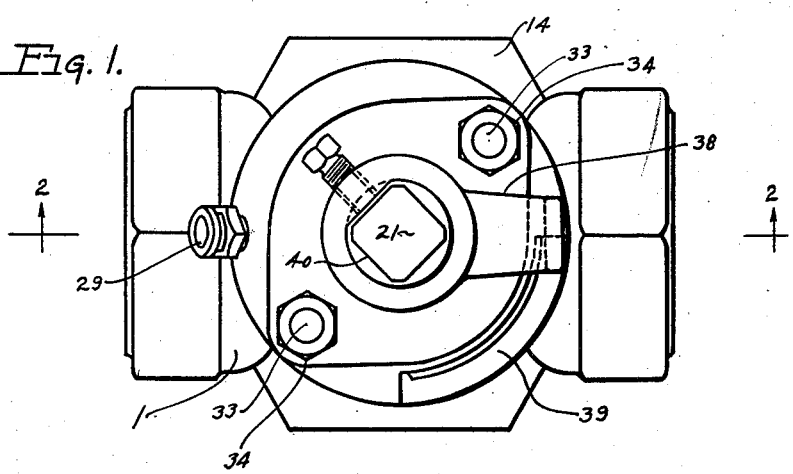
Figure 1 is a top plan view of the valve.
Figure 2:
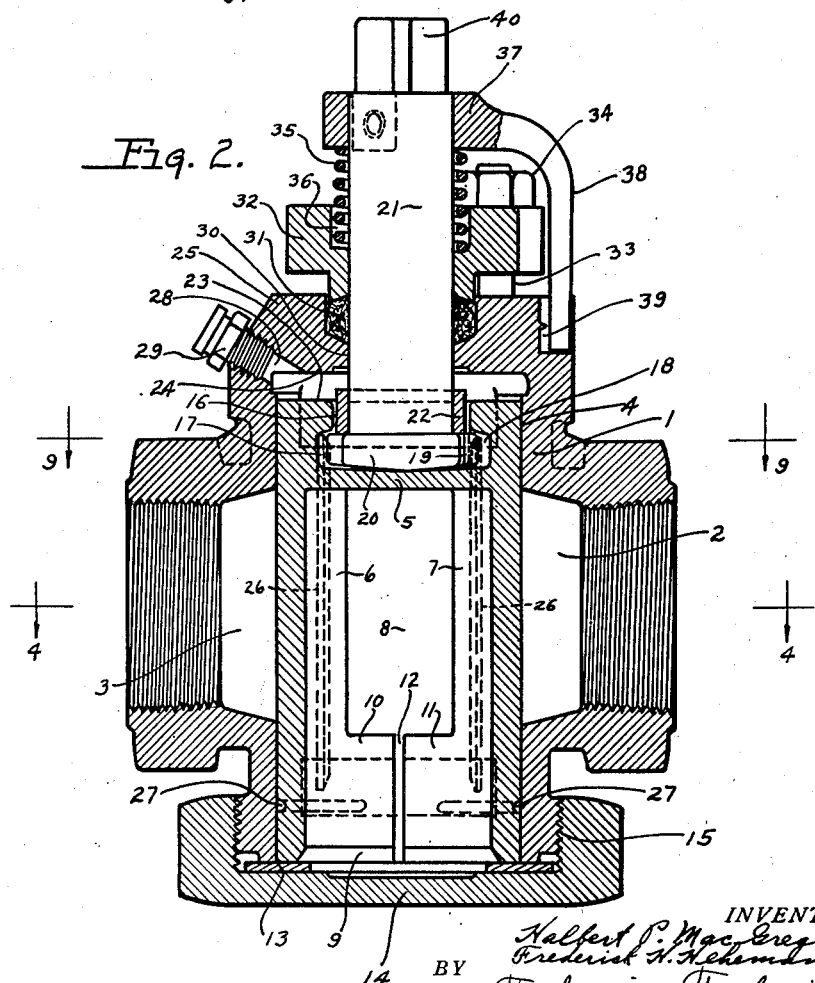
Figure 3:
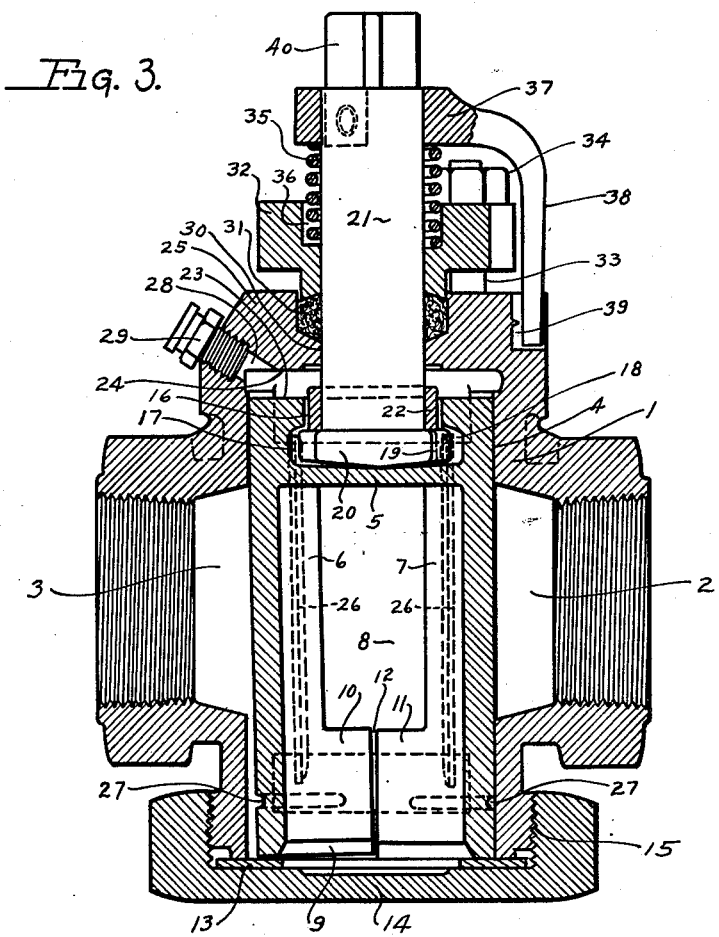
Figure 4:
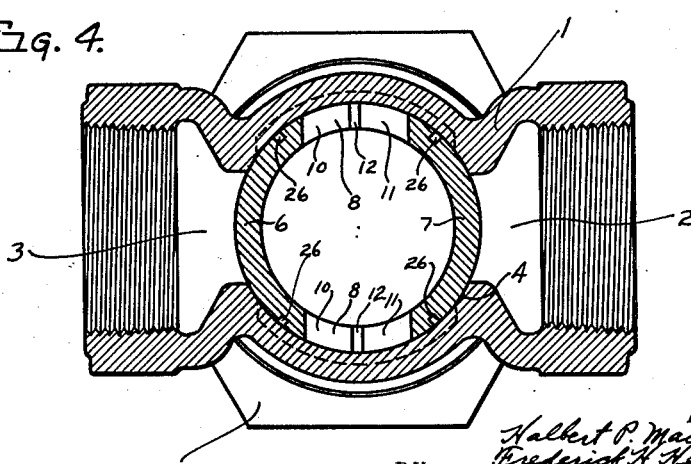
Figure 5:
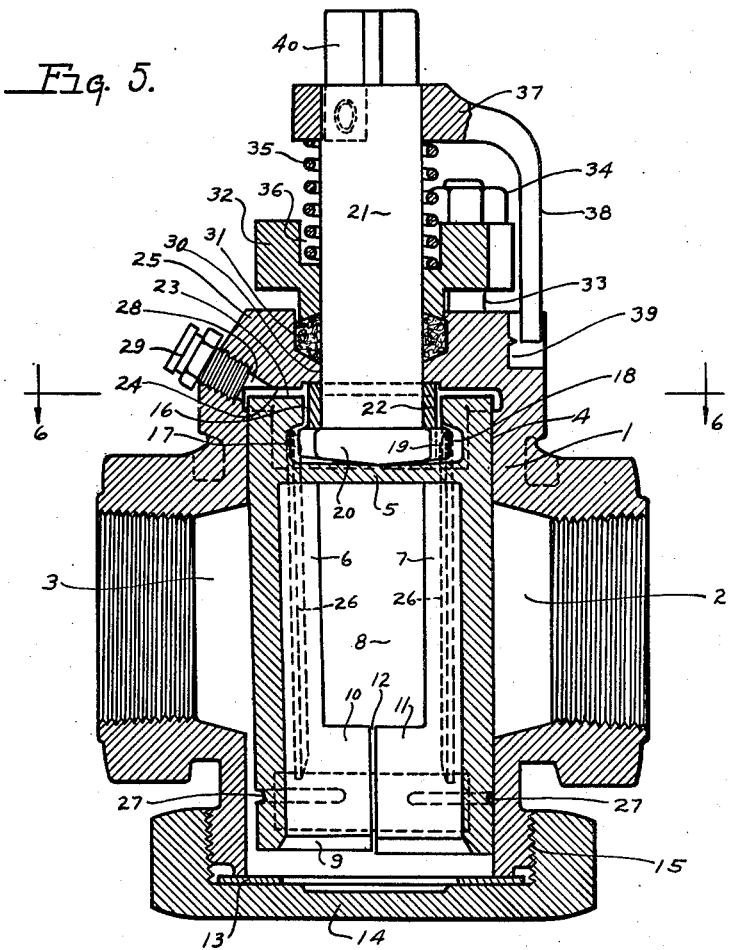
Figure 6:
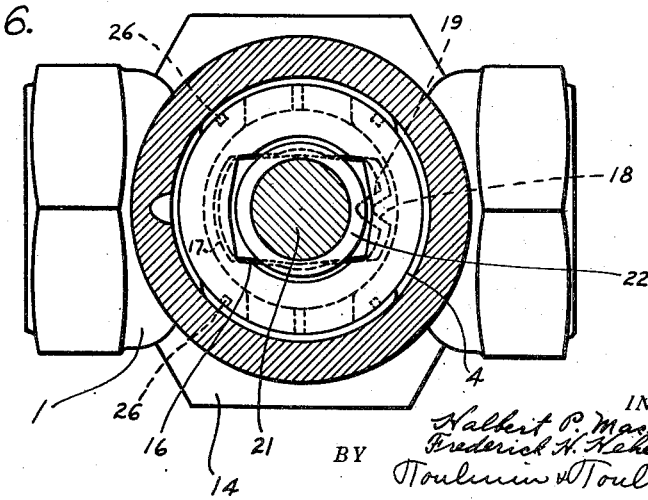

Figure 3 is a greatly exaggerated view of the first effect of the line pressure upon the split rotor showing how the line pressure on the left hand side first urges the adjacent wall of the rotor inwardly to permit the entrance of the line pressure between the lower end of the side wall and the adjacent casing wall on its way around the bottom of the rotor through the open end thereof through the interior thereof;

Figure 4 is a section on the line 4—4 of Figure 2;

Figure 5 is a greatly exaggerated view showing the second stage of the operation of the line pressure which has now moved the rotor and its stem due to the unbalanced condition upwardly so as to squeeze the lubricant from the lubricant chamber downwardly between the rotor side walls and the casing;

Figure 6 is a section on the line 6—6 to bring out the mechanical arrangement of the detachable stem with respect to the rotor;

Figure 7 is a view showing the method of mounting the detachable stem into the top of the rotor;

Figure 8 is a perspective of the rotor showing the projecting jaws on the end of the stem;

Figure 9 is a section on the line 9—9 of Figure 2 showing how the projecting shoulder of the rotor and the projecting jaws of the stem engage one another for rotation of the stem and rotor together.

Referring to the drawings in detail, 1 generally designates a casing having a passageway 2 in alignment with the passageway 3 and separated by a transversal chamber generally designated 4 for receiving a rotor hereinafter described. The line pressure may proceed from either side that is from passageway 2 or the passageway 3. The rotor comprises a closed top 5 with spaced semicircular side walls 6 and 7 depending therefrom and forming between them an aperture 8 through which the line pressure may flow when the valve is in open position, the valve being hollow and having an open end 9. The lower ends of these side walls are provided with laterally extending skirts 10 and 11, the ends of which are separated by a narrow slot 12.

The open end of the rotor may rest upon the gasket 13 carried by the detachable closure member 14 threaded at 15 on the bottom of the valve casing 1. This closure member 14 closes the lower end of chamber 4 through which the rotor is inserted into the valve.

The upper end 5 of the rotor is provided with a valve stem chamber comprising a restricted opening 16 and an expanded chamber 17 having a projecting shoulder of wedge shape 18 which is embraced on either side by the jaw 19 on the head 20 of the valve stem 21. A closure washer 22 may be provided on the valve stem which rests within the restricted throat 16 and upon the valve stem head 20. This washer 22 limits the lateral movement of the stem 21 with relation to the rotor. The upper surface 23 of the rotor is normally spaced from the inner surface 24 of the top 25 of the casing to form a lubricant chamber from which lubricant is expelled by the movement of the rotor through the vertical grooves 26 on the exterior of the side walls 6 and 7. Below these vertical grooves are transverse grooves 27 also adapted to distribute lubricant laterally about the bottom of the side walls and along the skirts 10 and 11.

A lubricant valve is supplied to the lubricant chamber formed by the walls 23 and 24 through the passageway 28 that is normally closed by the screw plug 29.

The valve stem 21 which passes through the aperture 30 in the casing cover 25 is surrounded by a packing 31, a packing gland 32 held in position by the bolts 33 and nuts 34. The stem also passes through a helical spring 35 which rests in a recess 36 in a packing gland 32 and engages its upper side and a collar 37 mounted on the valve stem which is provided with a depending indicating finger 38 that is insertable into an arcuate slot 39 to indicate the vertical and rotatable movement of the rotor. This results in showing whether the rotor is in open or closed position and how much lubricant is in the lubricant chamber. The top of the valve stem is provided with a squared head 40 for receiving an operating tool or wrench.

The spring 35 serves to normally move the rotor and its stem upwardly so that it will always be in its uppermost position so far as the supply of lubricant in the lubricant chamber will permit, thus enabling the condition of the supply lubricant in the lubricant chamber to be indicated when the line pressure is not on the line within the casing.

In operation, the valve stem head 20 is inserted at an angle through the rectangular opening 16 with the jaws 19 in position to engage the shoulder 18 and as such engagement takes place the head 20 assumes a horizontal position within the valve receiving chamber. The square head 20 fitting within the square opening and serving to rotate the valve and the jaws 19 engaging the shoulder 18 facilitates this movement. It will also be noted that due to these jaws there can be lateral movement of the rotor and stem with respect to one another which accommodates the springing and lateral movement of the rotor when the line pressure is applied.

It is a further object of these jaws to insure application of the valve stem to the rotor upon the exact position desired so that it is impossible to assemble the valve in other than operative position. This loose connection between the valve stem and the rotor permits a slight rocking movement between them to accommodate the lateral movement and the springing movement of the split rotor while maintaining the relationship necessary for the rotation of the two members together.

It will be noted in Figure 3, which is greatly exaggerated, that the first application of line pressure on the left hand side when the valve is in closed position results in the movement of the wall of the rotor laterally to permit the line pressure to escape between the lower end of the side wall 6 and its apron 10 into the open end 9 of the rotor to apply the line pressure against the closed end 5 which results, as will be seen in Figure 5, in moving the rotor upwardly. It will be understood in practice that this movement of one of the side walls is quite slight and that it has been exaggerated in the drawings for illustrative purposes. A small amount of line pressure is sufficient to act on the wall to move it. The result is that the valve always moves in the proper direction and does not have an erratic movement of first down and then up, as would otherwise be the case. This accomplishes a very large saving of lubricant as we have found in practice.

The use of the steel stem which can be properly forged or turned enables a very hard member to be economically produced which is subjected to the abuse of the operating tools on the head 40, while at the same time securing the advantages of a cast iron rotor which must be flexible as indicated. It also permits of the use of one type of material, such as non-corrosive material for the rotor and casing and a material which would be subject to corrosion for the stem which must be of such strength or hardness that it will resist wear of the operating tools. It will be noted that the lower end of the stem is completely protected by the lubricant in the lubricant chamber. The rotor is unbalanced because the area of the greater line pressure on the interior of the rotor is superior to the area of the atmospheric pressure on the lesser area on the stem.

It will be further understood that the rotor is unbalanced because the line pressure acts on the area of the rotor and this area is greater than the area of the lubricant chamber, the size of which is reduced by the area of the stem which passes through the chamber and out of the casing. The end of the stem is subjected to ordinary atmospheric pressure. Consequently the lubricant pressure is greater than the line pressure and the lubricant is forced out between the rotor and the valve casing for lubricating the parts.

It will be noted that the valve stem 21 is movable laterally but that the flexing of the rotor and its movement to find its seat laterally will be unimpeded by reason of the loose connection between the rotor and the stem, providing for lateral movement of the rotor.

It will be understood that we desire to comprehend within our invention such modifications as may be clearly embraced within the scope of our claims and invention.

Having thus fully described our invention, what we claim as new and desire to secure by Letters Patent is:

1. In a lubricated valve, a casing having a passageway therethrough, an unbalanced rotor in said casing, a detachable stem connected to the rotor extending out of the casing, and means forming permanent parts of the rotor and the stem to prevent detachment of the stem from the rotor when in alignment with the rotor, said rotor having spaced, yielding side walls.

2. In a lubricated valve, a casing having a line pressure passageway therethrough, a cylindrical unbalanced rotor having an open bottom and a hollow interior with a closed top spaced from the top of the casing to form a lubricant chamber, a detachable valve stem mounted in the top of the rotor extending out of the casing, interlocking parts on said rotor and stem adapted to be released by lateral and tilting movements of the stem with relation to the rotor and yielding means for moving said valve stem with the rotor to maintain said rotor and valve stem in the uppermost position.

3. In a lubricated valve, a two-way valve casing, a reciprocable rotor mounted therein having depending spaced side walls for closing said passageways, the interior of said rotor being hollow and the top closed, said top being spaced from the top of the casing to form a lubricant chamber, a detachable valve stem in the top of the rotor extending therethrough out of the casing, means on the rotor and stem to lock them together as long as they are in axial alignment and adapted to be released when the stem is moved laterally with relation to the rotor and tilted out of axial alignment and yielding means for moving said valve stem with the rotor to maintain said rotor and valve stem in the uppermost position.

4. In combination, in a lubricated valve, a casing having a line passageway therethrough, a cylindrical, unbalanced rotor having an opening therein and a flange in said opening, a detachable valve stem having a shoulder in said opening behind the flange and extending out of said casing, said opening being closed on all lateral sides, yielding means for moving said valve stem with the rotor to maintain said rotor and valve stem in the uppermost position and an indicator to indicate the degree of rotation and the vertical position of the valve stem and the rotor.

5. In a lubricated valve, a casing having a passageway therethrough, an unbalanced rotor in said casing, a flange on said rotor, a detachable stem connected to the rotor extending out of the valve casing, a shoulder on the stem to engage the flange, means to hold the shoulder in engagement with the flange, yielding means for moving said valve stem with the rotor to maintain said rotor and valve stem in the uppermost position and an indicator to indicate the degree of rotation and the vertical position of the valve stem and the rotor.

6. In a lubricated valve, a two-way valve casing, a bifurcated split, unbalanced rotor having an open end and a closed top, a detachable valve stem mounted in the closed top of the rotor and relatively laterally movable with respect thereto to a limited extent, means to cause said valve stem and rotor to rotate together, and a ring on the stem to engage the rotor to limit the lateral movement of the stem on the rotor.

7. In a lubricated valve, a two-way valve casing, a bifurcated, split, cylindrical, unbalanced rotor having an open end and a closed top, a detachable valve stem mounted in the closed top of the rotor and relatively laterally movable to a limited extent with respect to the rotor, means to cause said valve stem and rotor to rotate together, and a ring loosely mounted on the stem to prevent its lateral movement on the rotor.

8. In a lubricated valve, a two-way valve casing, a bifurcated, split, cylindrical, unbalanced rotor having an open end and a closed top, a valve stem loosely mounted in the closed top of the rotor and relatively laterally movable to a limited extent with respect to the rotor, means to cause said valve stem and rotor to rotate together, yielding means adapted to move said valve stem and rotor together as a unit, and loosely mounted means to prevent lateral movement of the stem with relation to the rotor.

9. In a lubricated valve, a two-way valve casing, an unbalanced rotor having spaced, yielding side walls and a detachable stem mounted to said rotor extending out of the valve casing, a connection between said stem and rotor adapted to provide a limited relative lateral movement therebetween and rotary movement together, said rotor and said casing being spaced from one another to form a lubricant chamber, means of distributing said lubricant between said rotor and the valve casing, and loosely mounted means to prevent lateral movement of the stem with relation to the rotor.

HALBERT P. MacGREGOR.
FREDERICK H. HEHEMANN.